United States Patent
Tanaka

[19]

[11] Patent Number: 5,956,528

[45] Date of Patent: *Sep. 21, 1999

[54] LENS CONTROL APPARATUS

[75] Inventor: Taeko Tanaka, Yokohama, Japan

[73] Assignee: Canon Kabushiki Kaisha, Tokyo

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,503

[22] Filed: Jul. 25, 1997

[30] Foreign Application Priority Data

Jul. 30, 1996 [JP] Japan ................................... 8-215940

[51] Int. Cl.⁶ ............................ G03B 13/36; G02B 15/14
[52] U.S. Cl. ............................. 396/52; 396/81; 396/136; 359/698; 348/347; 348/356
[58] Field of Search ........................... 396/52–55, 80–82, 396/86, 135, 136; 348/208, 347, 358, 356; 359/698, 554

[56] References Cited

U.S. PATENT DOCUMENTS

| | | | |
|---|---|---|---|
| 4,735,494 | 4/1988 | Makino et al. | 348/347 X |
| 5,157,432 | 10/1992 | Fukuoka et al. | 396/81 |
| 5,164,756 | 11/1992 | Hirasawa | 396/81 |
| 5,200,860 | 4/1993 | Hirasawa et al. | 396/81 X |
| 5,249,010 | 9/1993 | Kaneda | 396/81 |
| 5,323,200 | 6/1994 | Hirasawa | 396/81 |

*Primary Examiner*—W. B. Perkey
*Attorney, Agent, or Firm*—Robin, Blecker & Daley

[57] ABSTRACT

A lens control apparatus which corrects a variation in a focus position due to a zooming operation by driving a compensator lens at a standard speed according to a predetermined cam locus is arranged to determine a correction direction on the basis of an integral value of a high-frequency component and a correction speed on the basis of the ratio of the high-frequency component to a luminance difference, and to combine the correction speed based on the state of focus with the standard speed.

32 Claims, 14 Drawing Sheets

A (n,v)

| v \ n | 0 | 1 | 2 | 3 | ... | k | ... | m |
|---|---|---|---|---|---|---|---|---|
| 0 | A(0,0) | A(1,0) | A(2,0) | A(3,0) | ... | A(k,0) | ... | A(m,0) |
| 1 | A(0,1) | A(1,1) | A(2,1) | A(3,1) | ... | A(k,1) | ... | A(m,1) |
| 2 | A(0,2) | A(1,2) | A(2,2) | A(3,2) | ... | A(k,2) | ... | A(m,2) |
| 3 | A(0,3) | A(1,3) | A(2,3) | A(3,3) | ... | A(k,3) | ... | A(m,3) |
| ⋮ | ⋮ | ⋮ | ⋮ | ⋮ | ⋮ | ⋮ | ⋮ | ⋮ |
| k | A(0,k) | A(1,k) | A(2,k) | A(3,k) | ... | A(k,k) | ... | A(m,k) |
| ⋮ | ⋮ | ⋮ | ⋮ | ⋮ | ⋮ | ⋮ | ⋮ | ⋮ |
| s | A(0,s) | A(1,s) | A(2,s) | A(3,s) | ... | A(k,s) | ... | A(m,s) |

$$ax = ak - \frac{(Zk - Zx)(ak - ak\text{-}1)}{(Zk - Zk\text{-}1)}$$

$$bx = bk - \frac{(Zk - Zx)(bk - bk\text{-}1)}{(Zk - Zk\text{-}1)}$$

IN-FOCUS STATE

OUT-OF-FOCUS STATE

LENS CONTROL APPARATUS

BACKGROUND OF THE INVENTION

1. Field of the Invention

The present invention relates to a lens control apparatus and a lens control method as well as a storage medium, all of which are suitable for use in a camera provided with an inner focus type of lens system.

2. Description of Related Art

FIG. 1 is a view showing a simple arrangement of an inner focus type of lens system which has conventionally been used. The arrangement shown in FIG. 1 includes a fixed first lens group 101, a second lens group (variator lens) 102 for performing a magnification varying operation, an iris 103, a fixed third lens group 104, a fourth lens group (hereinafter referred to as the focusing lens) 105 having both a focus adjusting function and a so-called compensation function which compensates for a movement of a focal plane due to a magnification varying operation, and a CCD (image pickup element) 106.

In the lens system which is arranged as shown in FIG. 1, since the focusing lens 105 has both the compensation function and the focus adjusting function, the position of the focusing lens 105 for forming an in-focus image on an image pickup surface of the CCD 106 differs for different subject distances even in the case of the same focal length.

If a variation in the position of the focusing lens 105 for forming an in-focus image on the image pickup surface of the CCD 106 is continuously plotted against different subject distances for different focal lengths, the resultant loci are as shown in FIG. 2. During a magnification varying operation, zooming free of defocusing is enabled by selecting a locus from the loci shown in FIG. 2 according to the subject distance and moving the focusing lens 105 along the selected locus.

A front-lens focus type of lens system is provided with a compensator lens which is independent of a variator lens, and the variator lens and the compensator lens are connected to each other by a mechanical cam ring. Accordingly, if a knob for manual zooming is provided on the cam ring so that the focal length can be manually varied, no matter how fast the knob may be moved, the cam ring rotates in accordance with the movement of the knob, and the variator lens and the compensator lens move along a cam groove in the cam ring. Therefore, as long as the focusing lens is in focus, the above operation does not cause defocusing.

In the control of the inner focus type of lens system having the above-described feature, it is general practice to previously store a plurality of pieces of locus information such as those shown in FIG. 2 in a lens control microcomputer in a particular form, select a locus according to the relative position between the focusing lens and the variator lens, and perform zooming while tracing the selected locus.

In such control, it is necessary to read the position of each of the focusing lens and the variator lens with a certain degree of accuracy, because the position of the focusing lens relative to the position of the variator lens is read from a storage element and applied to lens control. As can be seen from FIG. 2 as well, if the variator lens moves at or near a uniform speed, the inclination of the locus of the focusing lens successively varies with a variation in the focal length. This indicates that the moving speed and direction of the focusing lens vary successively. In other words, an actuator for the focusing lens needs to make a highly accurate speed response of 1 Hz up to several hundred Hz.

It is becoming general practice to use a stepping motor for the focusing lens of the inner focus type of lens system as an actuator which satisfies the above requirement. The stepping motor is capable of rotating in complete synchronism with a step pulse outputted from a lens control microcomputer or the like and showing a constant stepping angle per pulse, so that the stepping motor can realize high speed response, high stopping accuracy and high positional accuracy.

Furthermore, the stepping motor provides the advantage that since its rotating angle per step pulse is constant, the step pulse can be used for an increment type of encoder and a special position encoder is not needed.

As described above, if a magnification varying operation is to be carried out while keeping an in-focus state by using such a stepping motor, it is necessary to previously store the locus information shown in FIG. 2 in the lens control microcomputer or the like in a particular form (the loci themselves may be stored or a function which uses lens positions as variables may be stored), and read locus information according to the position or the moving speed of the variator lens and move the focusing lens on the basis of the read locus information.

FIGS. 3(a) and 3(b) are views aiding in explaining a locus tracing method which has previously been devised. In FIG. 3(a), $z0, z1, z2, \ldots, z6$ indicate the position of the variator lens, $a0, a1, a2, \ldots, a6$ and $b0, b1, b2, \ldots, b6$ respectively indicate representative loci stored in the lens control microcomputer, and $p0, p1, p2, \ldots, p6$ respectively indicate positions on a locus calculated on the basis of the two loci. An equation for calculating this locus is shown below:

$$p(n+1) = (|p(n)-a(n)|/|b(n)-a(n)|) * |b(n+1)-a(n+1)| + a(n+1). \quad (1)$$

According to Equation (1), for example, if the focusing lens is located at the position p0 in FIG. 3(a), the ratio in which the position p0 internally divides a line segment b0-a0 is obtained, and a point which internally divides a line segment b1-a1 in accordance with that ratio is determined as the position p1. The moving speed of the focusing lens required to keep an in-focus state can be found from the positional difference between the positions p1 and p0 and the time required for the variator lens to move between the positions z0 and z1.

A case in which the stop position of the variator lens is not limited only to boundaries having stored representative locus data will be described below with reference to FIG. 4. FIG. 4 is a view aiding in explaining a method of interpolating the position of the variator lens. FIG. 4 is an extracted portion of FIG. 3(a) and shows a case in which the variator lens can be stopped at an arbitrary stop position.

In FIG. 4, the vertical and horizontal axes respectively represent the position of the focusing lens and the position of the variator lens. Letting $Z0, Z1, \ldots, Zk-1, Zk, \ldots Zn$ represent the position of the variator lens, the corresponding positions of the focusing lens for different subject distances, i.e., the representative locus positions (the position of the focusing lens relative to the position of the variator lens) stored in a lens control microcomputer are as follows:

$a0, a1, \ldots, ak-1, ak, \ldots an,$ $b0, b1, \ldots, bk-1, bk, \ldots bn.$

If it is now assumed that the position of the variator lens is Zx which is not a zoom boundary position and the position of the focusing lens is px, positions ax and bx are obtained as follows:

$$ax = ak - (Zk-Zx) * ((ak-ak-1)/(Zk-Zk-1)), \quad (2)$$

$$bx = bk - (Zk-Zx) * ((bk-bk-1)/(Zk-Zk-1)). \quad (3)$$

Specifically, locus data corresponding to the same subject distance are selected from among four stored representative locus data (ak, ak-1, bk, bk-1 in FIG. 4) and internally divided in accordance with an internal ratio which is obtained from the current position of the variator lens and two adjacent opposite zoom boundary positions (for example, Zk and Zk-1 in FIG. 4), whereby the positions ax and bx can be obtained. Then, the locus data corresponding to the same focal length, which are selected from among the four stored representative locus data (ak, ak-1, bk, bk-1 in FIG. 4), are internally divided as shown by the above equation (1), in accordance with an internal ratio which is obtained from the positions ax, px and bx, whereby the positions pk and pk-1 can be obtained. Furthermore, during zooming from the wide-angle end toward the telephoto end, the moving speed of the focusing lens required to keep an in-focus state can be found from the difference between the target focusing-lens position pk and the current focusing-lens position px and the time required for the variator lens to move from the position Zx to the position Zk.

Furthermore, during zooming from the telephoto end toward the wide-angle end, the moving speed of the focusing lens required to keep an in-focus state can be found from the difference between the target focusing-lens position pk-1 and the current focusing-lens position px and the time required for the variator lens to move from the position Zx to the position Zk-1. The above-described locus tracing method has been devised.

As can be seen from FIG. 2, if the variator lens moves from the telephoto end toward the wide-angle end in the direction in which divergent loci gradually converge, an in-focus state can be maintained by the above-described locus tracing method. However, if the variator lens moves from the wide-angle end toward the telephoto end, it becomes impossible to determine which locus should be traced by the focusing lens which is located at a point on convergent loci, so that an in-focus state cannot be maintained by the above-described locus tracing method.

FIGS. 5(a) and 5(b) are views aiding in explaining one example of a locus tracing method which has previously been devised to solve the above-described problem. In each of FIGS. 5(a) and 5(b), the horizontal axis represents the position of the variator lens, and the vertical axis of FIG. 5(a) represents a peak level (sharpness peak signal) within a vertical synchronizing period of a high-frequency component of a luminance signal, which is an AF evaluation signal, whereas the vertical axis of FIG. 5(b) represents the position of the focusing lens.

In FIGS. 5(a) and 5(b), it is assumed that a locus 604 is an in-focus cam locus to be used for zooming relative to a certain subject. It is also assumed that an in-focus cam locus tracing speed on the wide-angle side of a variator-lens position 606 (Z14) is positive (the focusing lens moves toward its closest-distance end), and that an in-focus cam locus tracing speed on the telephoto side of the position 606 is negative (the focusing lens moves toward its infinity end). If the focusing lens traces the cam locus 604 while maintaining an in-focus state, the sharpness peak signal exhibits the magnitude shown at 601. It is generally known that zooming which maintains an in-focus state exhibits a sharpness peak signal level which has an approximately constant value.

In FIG. 5(b), Vf0 indicates the moving speed of the focusing lens which traces the in-focus cam locus 604 during zooming, and Vf indicates an actual moving speed of the focusing lens. If zooming is performed while varying its speed with respect to the speed Vf0 which traces the locus 604, a zigzag locus like a locus 605 is obtained. In this case, the sharpness peak signal level varies in such a manner that hills and valleys repeatedly occur like a locus 603. The magnitude of the sharpness peak signal 603 reaches its maximum at each position where the loci 604 and 605 cross each other (even-numbered points among Z0, Z1, . . . , Z16), whereas the magnitude of the sharpness peak signal 603 reaches its minimum at each position where the moving-direction vector of the locus 605 switches over (odd-numbered points among Z0, Z1, . . . , Z16). The sharpness peak signal 603 has a minimum value 602, and if the minimum value 602 is set as a level TH1 and the moving-direction vector of the locus 605 is switched over each time the magnitude of the sharpness peak signal 603 becomes equal to the level TH1, the moving direction of the focusing lens after switchover can be set to a direction closer to the locus 604. In other words, each time an image is defocused by the difference between the levels 601 and 602 (TH1) of the sharpness peak signal, if the moving direction and the moving speed of the focusing lens are controlled to decrease the amount of defocusing, it is possible to effect zooming with the amount of defocusing reduced.

By using the above-described method, in the case of zooming from the wide-angle end toward the telephoto end in which convergent cam loci gradually diverge as shown in FIG. 2, even if the in-focus locus tracing speed Vf0 is unknown, it is possible to select a locus capable of preventing the sharpness peak signal level from falling below the minimum value 602 (TH1), i.e., preventing occurrence of not less than a certain amount of defocusing, by repeating a switchover operation like the locus 605 (in accordance with a variation in the sharpness peak signal level) while controlling the moving speed Vf of the focusing lens with respect to the tracing speed (calculated by using p(n+1) obtained from Equation (1)) described above in connection with FIGS. 3(a) and 3(b).

Letting Vf+ and Vf− be a positive correction speed and a negative correction speed, respectively, the moving speed Vf of the focusing lens is determined as:

$$Vf = Vf0 + Vf+, \quad (4)$$

$$Vf = Vf0 - Vf+. \quad (5)$$

At this time, to prevent the correction speeds Vf+ and Vf− from deviating in either correction direction when a focus locus to be traced is selected, the correction speeds Vf+ and Vf− are determined so that the internal angle made by the two direction vectors of the moving speed Vf which are obtained from the above equations (4) and (5) is divided into two equal angles by the direction vector of the in-focus locus tracing speed Vf0. In addition, another method has been devised which is intended to improve the accuracy of selection of a focus locus to be traced by varying the magnitude of a correction speed according to the kind or state of a subject, the focal length and the depth of field. Yet another method has been devised in which a focus locus is traced by using an integral signal which varies sensitively to defocusing.

However, in any of the above-described examples, if the same subject is photographed in its in-focus state while varying the angle of view from the wide-angle side to the telephoto side, a sharpness integral signal (the value obtained by adding together sharpness peak signals which appear within a horizontal synchronizing period, within the interval of a vertical synchronizing period) varies to a great extent according to the angle of view even during the in-focus state. For this reason, it is difficult to determine whether the subject is in focus, merely by using the sharpness integral signal, and it is impossible to determine whether a variation in the sharpness integral signal is due to defocusing or a variation in the subject. Accordingly, if a correction speed is determined by using only the sharpness integral signal, the correction speed becomes excessively large when the sharpness integral signal is small during an in-focus state. This leads to the problem that the state of focusing unstably fluctuates between an in-focus state and an out-of-focus state during zooming, so that the in-focus state cannot be maintained during zooming.

BRIEF SUMMARY OF THE INVENTION

The present invention has been made to solve the above-described problems, and its first object is to provide a lens control apparatus capable of securely performing focus adjustment during a zooming operation.

A second object of the present invention is to provide a lens control method and a lens control apparatus both of which are capable of selecting an in-focus cam locus and effecting focusing control free of defocusing, when a magnification varying operation from a wide-angle side toward a telephoto side is being performed with an in-focus locus unknown.

A third object of the present invention is to provide a storage medium in which a program for controlling the lens control apparatus according to the present invention is stored.

To achieve the above objects, according to one aspect of the present invention, there is provided a lens control method which comprises a driving step of moving a first lens group for performing a magnification varying operation and a second lens group for correcting a movement of a focal plane during a movement of the first lens group, an extracting step of extracting a high-frequency component from a luminance signal of a picked-up subject image, a peak value detecting step of detecting a peak value of the high-frequency component, an integral value detecting step of detecting an integral value of the high-frequency component, a difference detecting step of detecting a difference between a maximum value and a minimum value of the luminance signal, a calculating step of obtaining a standard moving speed of the second lens group for correcting the movement of the focal plane during the movement of the first lens group, from information in which is stored an in-focus position of the second lens group relative to a position of the first lens group according to a subject distance, a speed combining step of combining a correction speed with the standard moving speed of the second lens group obtained in the calculating step during the magnification varying operation, and a control step of, during the magnification varying operation, controlling a direction of the correction speed according to a variation in the integral value of the high-frequency component, controlling the correction speed on the basis of a ratio of the peak value of the high-frequency component to the difference between the maximum value and the minimum value of the luminance signal, and executing control to combine the correction speed with the standard moving speed during the magnification varying operation.

To achieve the above objects, in accordance with another aspect of the present invention, there is provided a lens control apparatus which comprises a first lens group for performing a magnification varying operation, a second lens group for correcting a movement of a focal plane during a movement of the first lens group, driving means for moving said first lens group and said second lens group, extracting means for extracting a high-frequency component from a luminance signal of a picked-up subject image, peak value detecting means for detecting a peak value of the high-frequency component, integral value detecting means for detecting an integral value of the high-frequency component, difference detecting means for detecting a difference between a maximum value and a minimum value of the luminance signal, storing means in which is stored an in-focus position of said second lens group relative to a position of said first lens group according to a subject distance, calculating means for obtaining from information stored in said storing means a standard moving speed of said second lens group for correcting the movement of the focal plane during the movement of said first lens group, speed combining means for combining a correction speed with the standard moving speed of the second lens group obtained by said calculating means during the magnification varying operation, and control means for, during the magnification varying operation, controlling a direction of the correction speed according to a variation in the integral value of the high-frequency component, controlling the correction speed on the basis of a ratio of the peak value of the high-frequency component to the difference between the maximum value and the minimum value of the luminance signal, and executing control to combine the correction speed with the standard moving speed during the magnification varying operation.

Another object of the present invention is to provide an automatic focus adjusting apparatus capable of performing a stable operation free of malfunction at all times.

Another object of the present invention is to realize optimization of lens control in a video camera arranged to perform focus detection on the basis of a predetermined component in a picked-up image signal and perform control of an inner focus type of lens system.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to FIGS. 6 to 14.

First Embodiment

Figure 6:
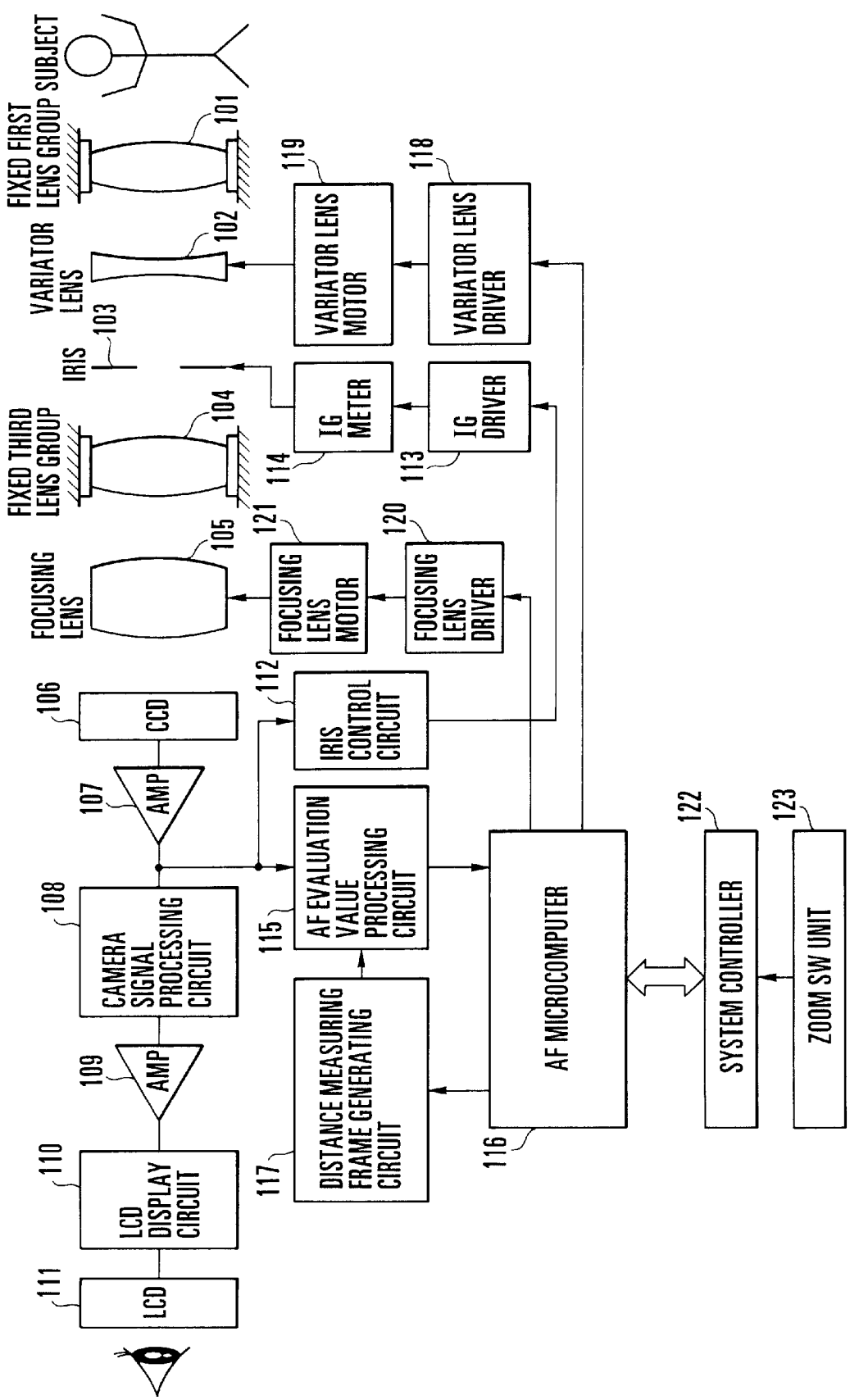
FIG. 6 is a block diagram showing the arrangement of a video camera system having a lens control apparatus according to a first embodiment of the present invention.

A first embodiment of the present invention will be described below with reference to FIGS. 6 to 10. FIG. 6 is a block diagram showing the arrangement of a video camera system which is provided with a lens control apparatus according to the first embodiment. The arrangement shown in FIG. 6 includes a fixed first lens group 101, a second lens group 102 for performing a magnification varying operation (hereinafter referred to as the variator lens 102), an iris 103, a fixed third lens group 104, and a focus compensator lens 105 which is a fourth lens group having both a compensation function and a focusing function (hereinafter referred to as the focusing lens 105). These constituent elements 101 to 105 constitute an inner focus type of lens system. Image light which has passed through this lens system is focused on an image pickup surface of a CCD (image pickup element) 106 and converted into a video signal by photoelectric conversion in the CCD 106. The video signal is supplied to a camera signal processing circuit 108 via an amplifier (or an impedance converter: AMP) 107. The video signal processed by the camera signal processing circuit 108 is amplified to a prescribed level by an amplifier (AMP) 109, and the amplified video signal is processed by an LCD display circuit 110. The thus-obtained picked-up image is displayed on an LCD (liquid crystal display) 111.

The video signal amplified by the amplifier 107 is also supplied to both an iris control circuit 112 and an AF (autofocus) evaluation value processing circuit 115. The iris control circuit 112 drives an IG driver 113 and an IG meter 114 according to the input level of the video signal, thereby controlling the iris 103 to make adjustment of the amount of light. The AF evaluation value processing circuit 115 extracts a high-frequency component of a luminance signal within a distance measuring frame according to a gate signal supplied from a distance measuring frame generating circuit 117, and performs processing of the extracted high-frequency component. An AF microcomputer 116 performs control of the driving of the focusing lens 105 and control of the distance measuring frame for varying a distance measuring area, according to the strength of an AF evaluation signal. In addition, the AF microcomputer 116 and a system control microcomputer (hereinafter referred as to the system controller) 122 communicate predetermined information to each other, such as information relative to a zoom switch unit 123, which information is read by the system controller 122 through A/D conversion or the like, and magnification-varying-operation information such as a zooming direction and a focal length for zooming which is controlled by the AF microcomputer 116. (The zoom switch unit 123 is a zoom switch which is formed as one unit and outputs a voltage according to the rotating angle of an operating member, and variable-speed zooming is performed according to the output voltage.)

A driver 118 outputs driving energy to a lens driving motor 119 according to an instruction to drive the variator lens 102, whereas a driver 120 outputs driving energy to a lens motor 121 according to an instruction to drive the focusing lens 105, both instructions being outputted from the AF microcomputer 116. The motors 119 and 121 are provided for driving the variator lens 102 and the focusing lens 105, respectively.

A method of driving the lens driving motors 119 and 121 will be described below. In the following description, by way of example, it is assumed that both motors 119 and 121 are stepping motors.

The AF microcomputer 116 determines a driving speed for the variator lens motor 119 and a driving speed for the focusing lens motor 121 by program processing, and supplies the respective driving speeds to the driver 118 for driving the variator lens motor 119 and to the driver 120 for driving the focusing lens motor 121, in the form of rotation frequency signals for the respective stepping motors. The AF microcomputer 116 also supplies drive/stop instructions for the respective motors 119 and 121 and rotating-direction instructions for the respective motors 119 and 121 to the corresponding drivers 118 and 120. The drive/stop signal and the rotating-direction signal for the variator lens motor 119 primarily correspond to the state of the zoom switch unit 123, whereas those for the focusing lens motor 121 correspond to a drive instruction which is determined by processing executed in the AF microcomputer 116 during AF or zooming. Each of the drivers 118 and 120 sets the phase order of four motor excitation phases to a phase order for forward rotation or a phase order for reverse rotation according to the corresponding rotating-direction signal, and outputs voltages (or currents) for the respective four motor excitation phases while varying the voltages (or the currents), according to the received rotating-frequency signal, thereby controlling the rotating direction and the rotating frequency of the corresponding one of the motors 119 and 121. The respective motor drivers 119 and 121 perform on/off control of their operations of outputting the voltages to the motors 119 and 121, according to the corresponding drive/stop instructions.

Figure 7:
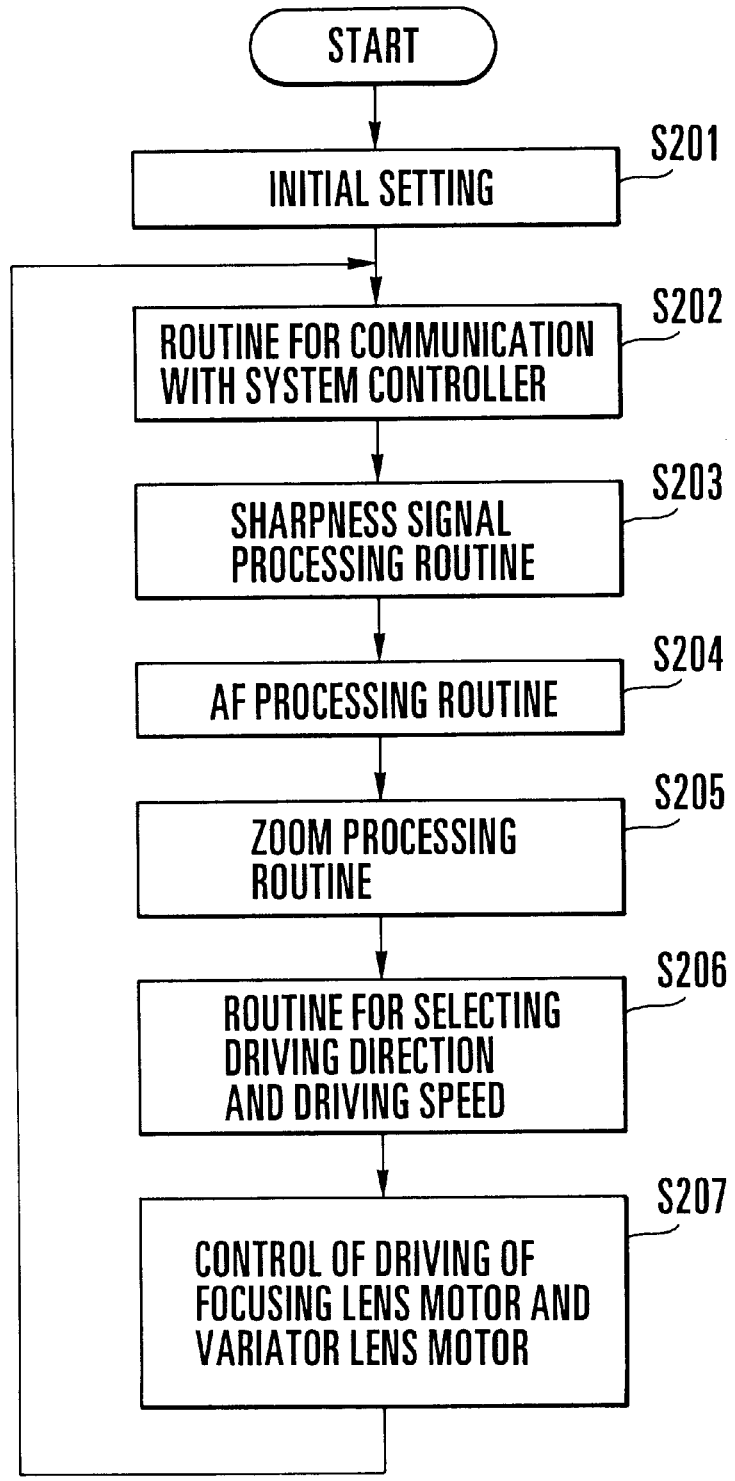
FIG. 7 is a flowchart showing an algorithm of the control operation of the lens control apparatus shown in FIG. 6.

The operation of the lens control apparatus according to the first embodiment having the above-described arrangement will be described below with reference to FIG. 7. FIG. 7 is a flowchart showing an algorithm of the control operation of the lens control apparatus according to the first embodiment, which algorithm is processed in the AF microcomputer 116.

Figure 1:
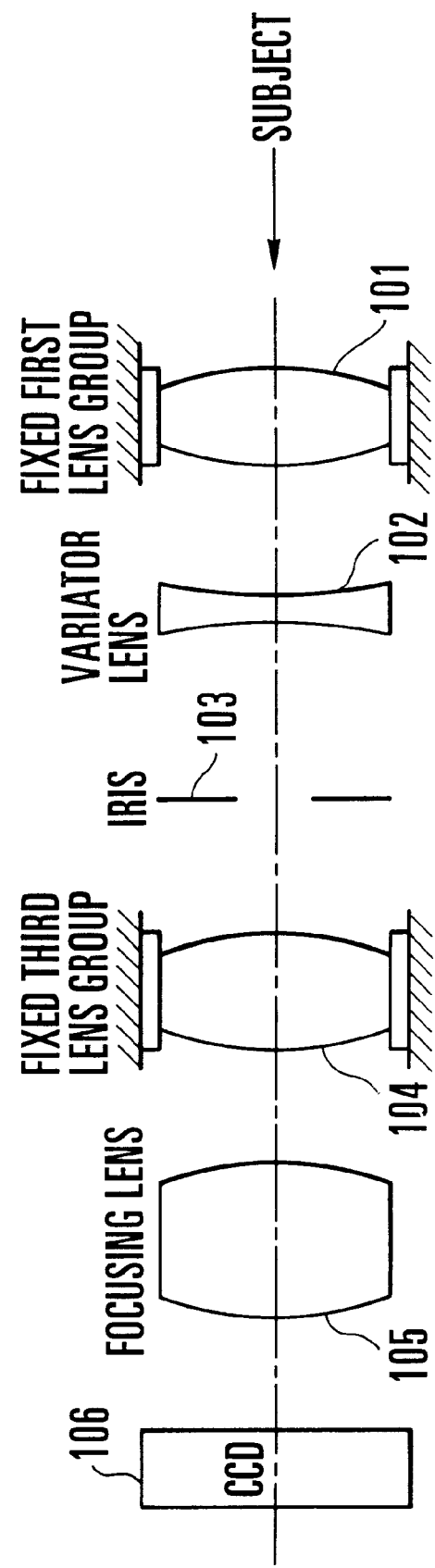
FIG. 1 is a view showing the arrangement of an inner focus type of lens system.
Figure 2:
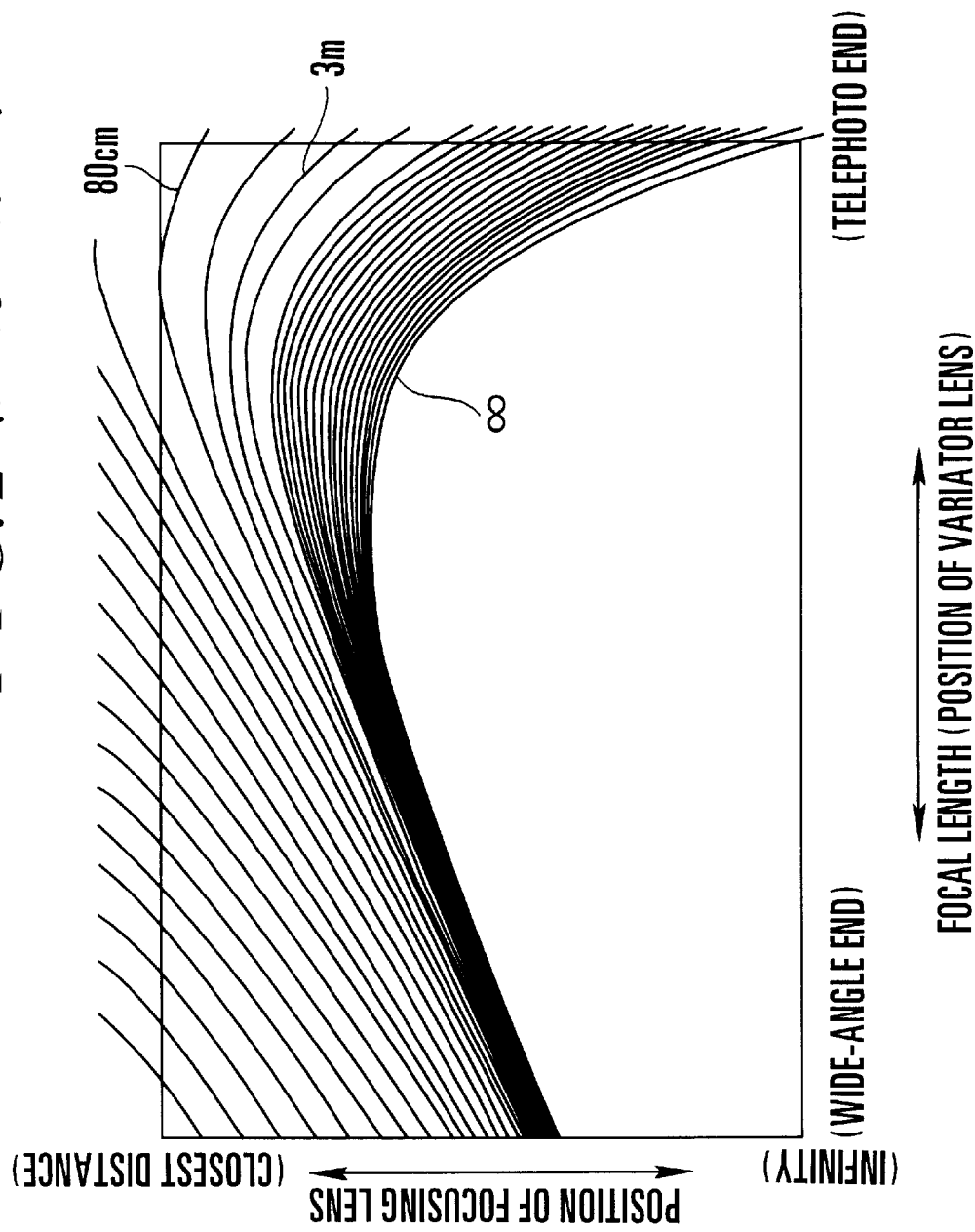
FIG. 2 is a view showing the loci obtained when the position of a focusing lens for forming an in-focus image on an image pickup surface is continuously plotted against different subject distances for different focal lengths.

In the flowchart of FIG. 7, Step S201 is an initial setting routine for executing processing for a RAM and various ports in the AF microcomputer 116. Step S202 is a routine for communication with the system controller 122, in which information relative to the zoom switch unit 123 and magnification-varying-operation information such as the position of the variator lens 102 are communicated between the AF microcomputer 116 and the system controller 122. Step S203 is a routine for forming a sharpness signal which constitutes an AF evaluation signal, from a signal obtained from the AF evaluation value processing circuit 115. Step S204 is an AF processing routine in which automatic focus adjustment processing is performed according to a variation in the AF evaluation signal. Step S205 is a zoom processing routine which serves as an compensation-operation processing routine for maintaining an in-focus state during a magnification varying operation. This routine calculates a driving direction and a driving speed for the focusing lens 105 which traces cam loci such as those shown in FIG. 2 referred to previously. This calculation processing will be described later in detail with reference to FIG. 8.

Step S206 is a routine for making selection from among the driving directions and the driving speeds for the variator lens 102 and the focusing lens 105 which have been calculated in Step S204 and Step S205, according to whether to execute an AF operation or a magnification varying operation, and executing setting so as not to drive the lenses 102 and 105 beyond their respective telephoto ends, wide-angle ends, closest-distance ends or infinity ends all of which are set by software so as to prevent the lenses 102 and 105 from coming into contact with end portions of their respective mechanical portions. In Step S207, the AF microcomputer 116 outputs control signals to the motor drivers 118 and 120 according to the driving directions and the driving speeds for the variator lens 102 and the focusing lens 105 which have been determined in Step S206, thereby controlling the respective motors 119 and 121 to drive or stop the variator lens 102 and the focusing lens 105. After the completion of the processing of Step S207, the process returns to Step S202.

The entire processing shown in FIG. 7 is executed in synchronism with each vertical synchronizing period (in the processing of Step S207, the process waits for the arrival of the next vertical synchronizing signal).

Figure 8:
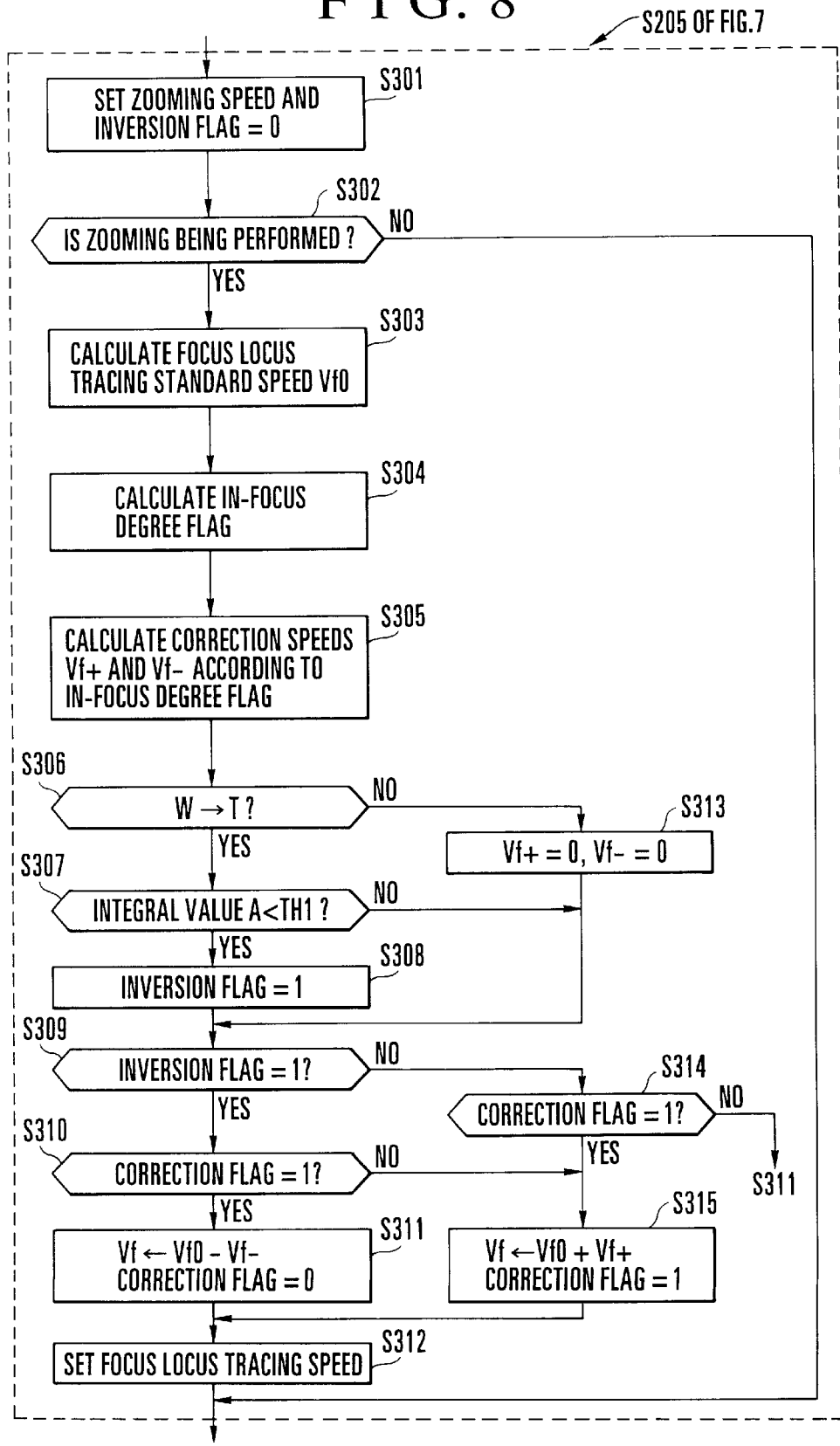
FIG. 8 is a flowchart showing an algorithm of the control operation of the lens control apparatus shown in FIG. 6.

FIG. 8 is a flowchart showing a subroutine which is incorporated in Step S205 of FIG. 7. Referring to FIG. 8, in Step S301, the AF microcomputer 116 sets a zooming speed on the basis of the information relative to the zoom switch unit 123 which has been obtained through the communication with the system controller 122, and resets an inversion flag to "0". Then, in Step S302, the AF microcomputer 116 determines whether zooming is being performed. If zooming is not being performed, the AF microcomputer 116 ends the subroutine incorporated in Step S205 of FIG. 7. If it is determined in Step S302 that zooming is being performed, the process proceeds to Step S303, in which the AF microcomputer 116 sets a standard cam locus on the basis of the respective positions of the variator lens 102 and the focusing lens 105 at that time as well as a stored representative cam table.

Figures 3A, 3B:
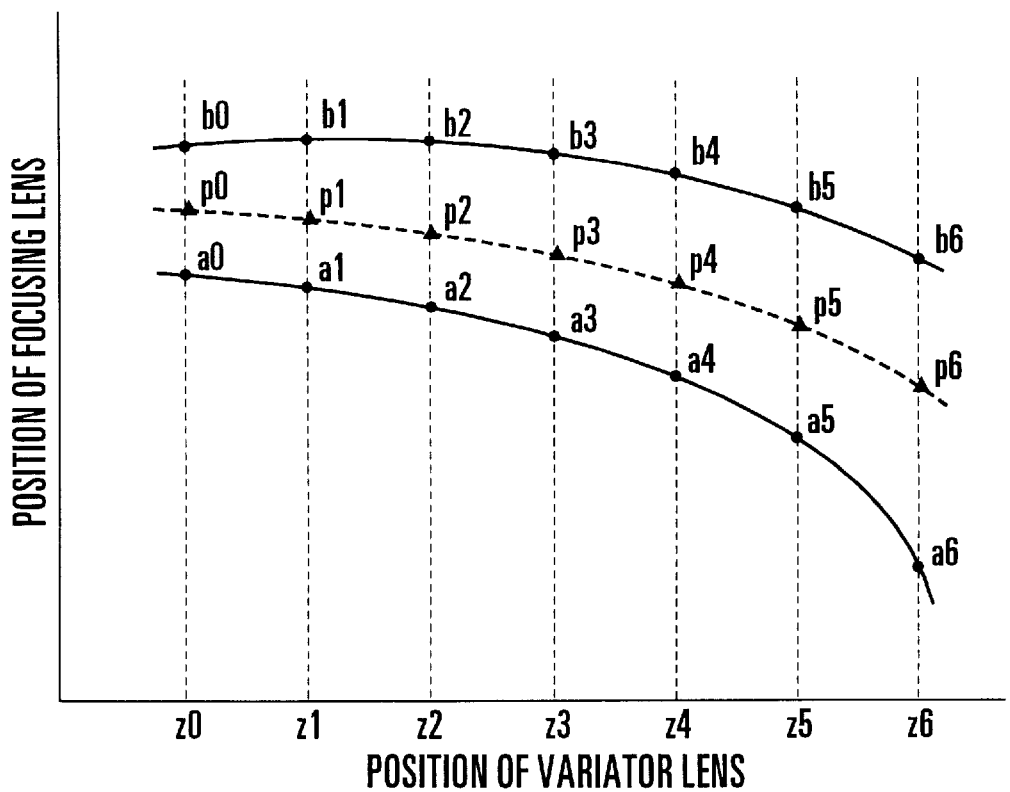
FIGS. 3(a) and 3(b) are views showing one example of a locus tracing method.
Figure 4:
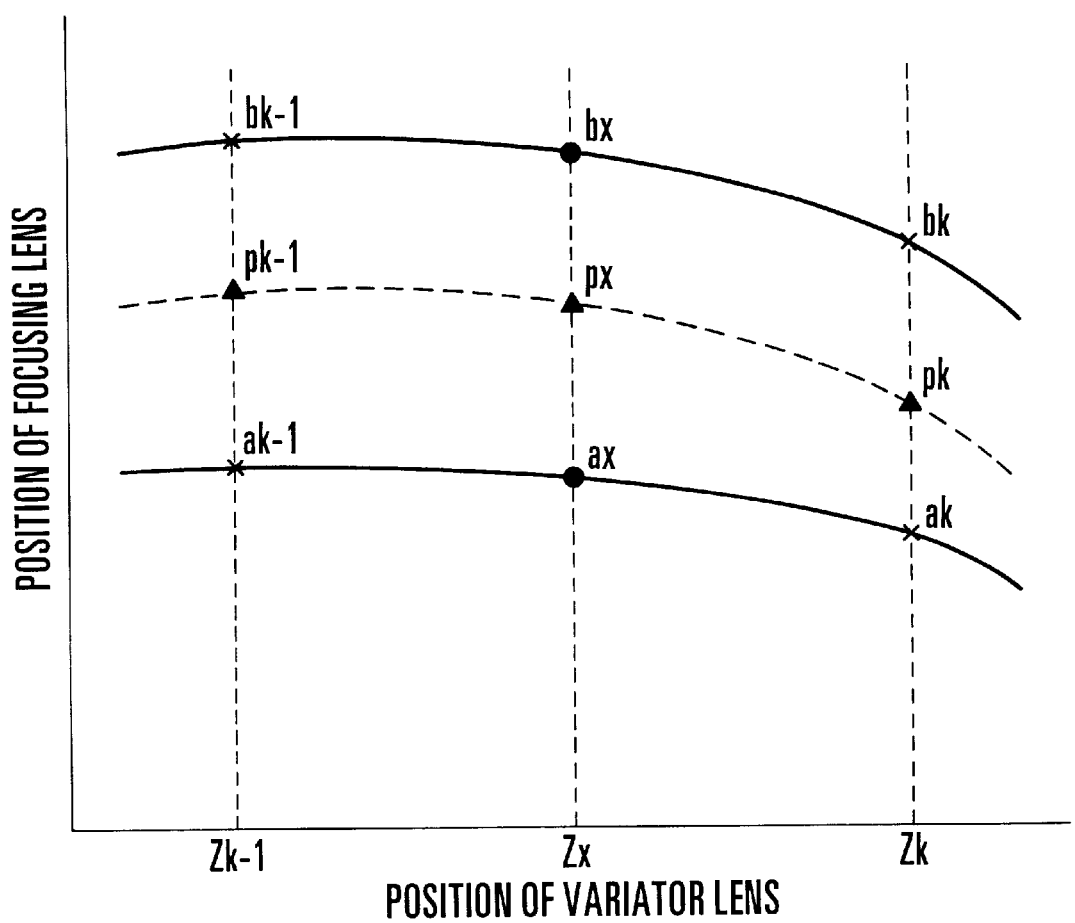
FIG. 4 is a view aiding in explaining a method of interpolating the position of a variator lens.

Referring to FIG. 3(a), assuming that the current position is p0, the ratio in which p0 internally divides a line segment b0-a0 ($\beta$) becomes:

$$(p0-a0)/(b0-a0)=\alpha/\beta.$$

In FIG. 3(b), since a0=A(0, 0) and b0=A(1, 0), the position p0 corresponds to a point which divides the line between n=0 and n=1 in the $\alpha/\beta$ ratio when v=0, and a locus is obtained by plotting such a point from a wide-angle end to a telephoto end (v=0, 1, . . . , s). Accordingly, if n, $\alpha$ and $\beta$ are calculated from the respective positions of the variator lens 102 and the focusing lens 105 at that time, the standard cam locus can be set. Then, the AF microcomputer 116 calculates a position p1 from the standard cam locus (n, $\alpha$ and $\beta$) and locus data stored in the AF microcomputer 116, by using Equation (1) described previously in connection with the related art, and then calculates a standard locus tracing speed Vf0 of the focusing lens 105 by using the value of this p1.

Then, in Step S304, the AF microcomputer 116 calculates an in-focus degree flag on the basis of the ratio of the peak value of a high-frequency component to the difference between the maximum value and the minimum value of a luminance signal.

Figure 9A:
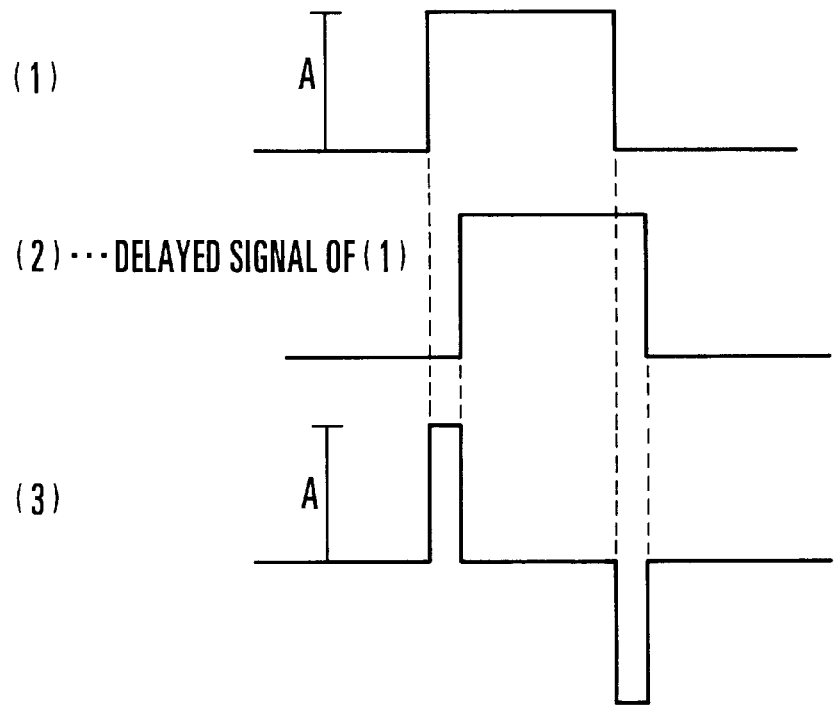
FIGS. 9(a) and 9(b) are views showing the outline of an in-focus degree flag.
Figure 9B:
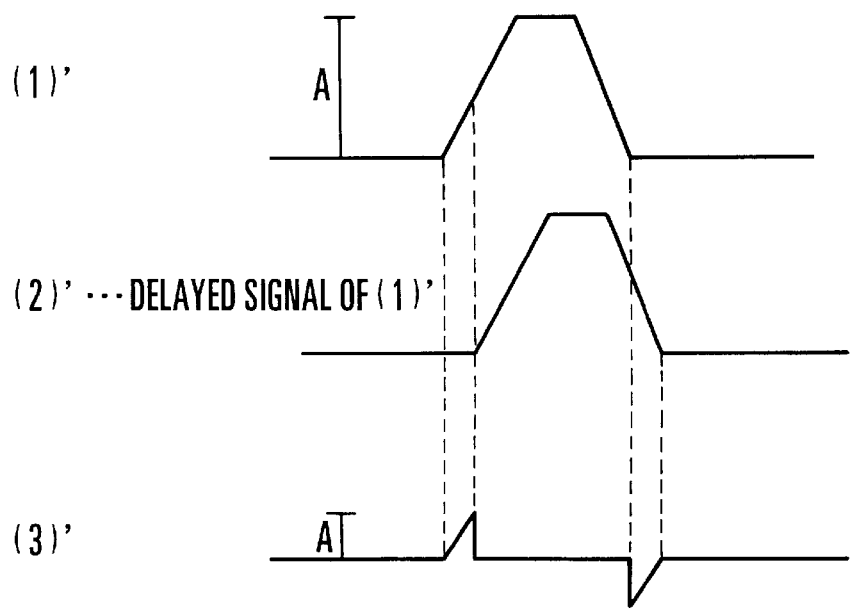

FIGS. 9(a) and 9(b) show the outline of the in-focus degree flag. FIG. 9(a) shows waveforms which are obtained from a luminance signal on a particular horizontal line during an in-focus state. In FIG. 9(a), a waveform (1) is that of the luminance signal obtained during the in-focus state, and a waveform (2) is obtained by delaying the waveform (1). By subtracting the waveform (2) from the waveform (1), a waveform (3) is formed, so that a pulse of height A is outputted. This pulse is used as a peak evaluation value. The difference between the maximum value and the minimum value of the luminance signal is represented as the height A in the waveform diagram (1) of FIG. 9(a). It is apparent, therefore, that the ratio of the peak evaluation value to the difference between the maximum value and the minimum value of the luminance signal is 1:1 for a subject having the contrast shown in FIG. 9(a). However, an actual luminance signal does not ideally rise as shown in FIG. 9(a), and the height A of the waveform (3) and the height A of the waveform (1) actually do not become equal to each other. In other words, (peak evaluation value)÷(maximum value−minimum value) becomes a constant value of less than "1".

FIG. 9(b) shows waveforms which are obtained from a luminance signal on a particular horizontal line during an out-of-focus state. As shown in FIG. 9(b), the peak evaluation value of the luminance signal has the height A shown in a waveform diagram (3)', and the difference between the maximum value and the minimum value of the luminance signal value is represented as the height A shown in a waveform diagram (1)' of FIG. 9(b). It is apparent, therefore, that the value of "(peak evaluation value)÷(maximum value−minimum value)" becomes smaller than that during the in-focus state. In this manner, an in-focus degree can be calculated from the peak value and the difference between the maximum value and the minimum value.

Figures 5A, 5B:
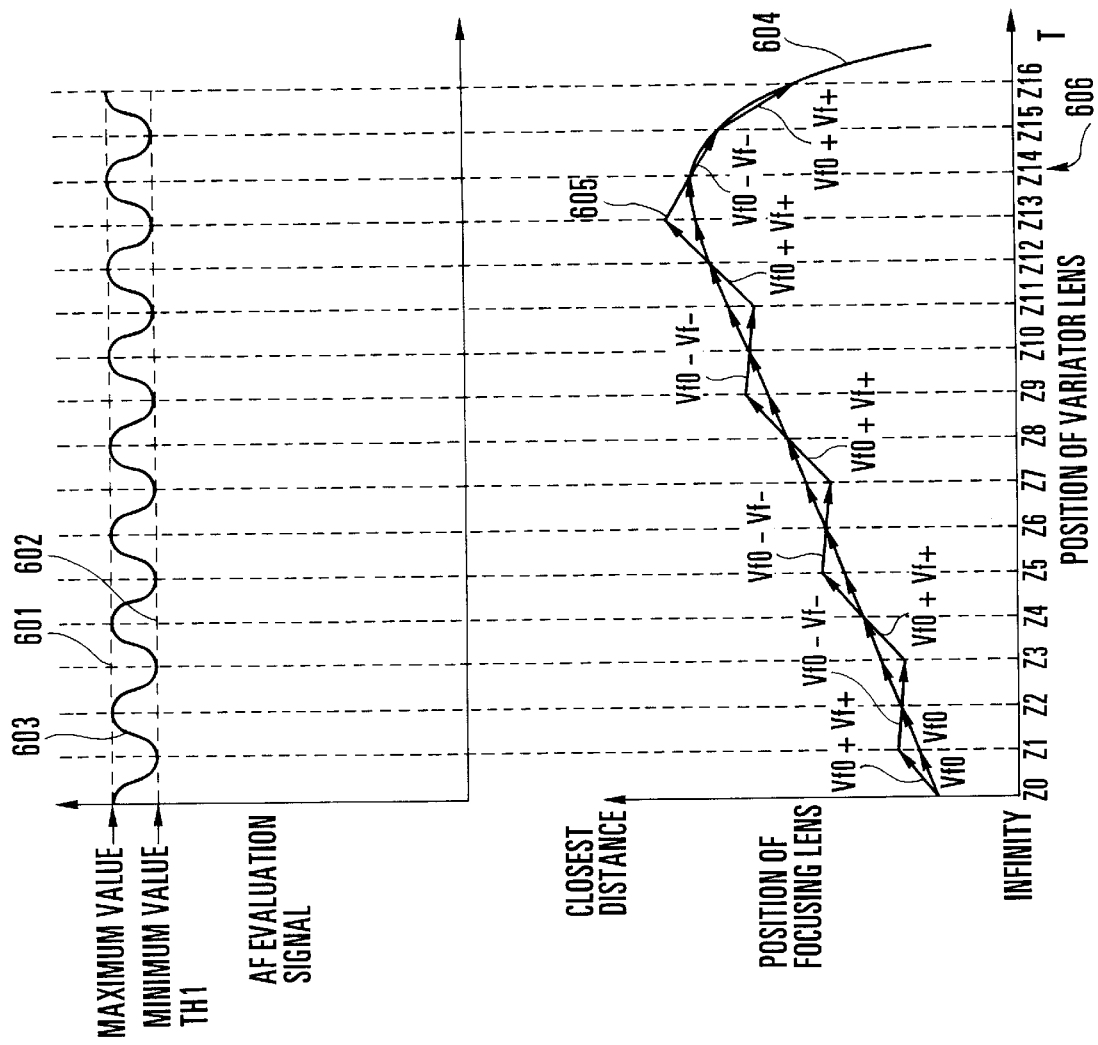
FIGS. 5(a) and 5(b) are views showing one example of a locus tracing method.

Referring again to FIG. 8, in Step S305, the AF microcomputer 116 calculates correction speeds Vf+ and Vf− which are respectively required for driving the focusing lens 105 in the "+" and "−" directions shown in FIG. 5(b). The correction speeds Vf+ and Vf− are calculated in the following manner.

Figure 10:
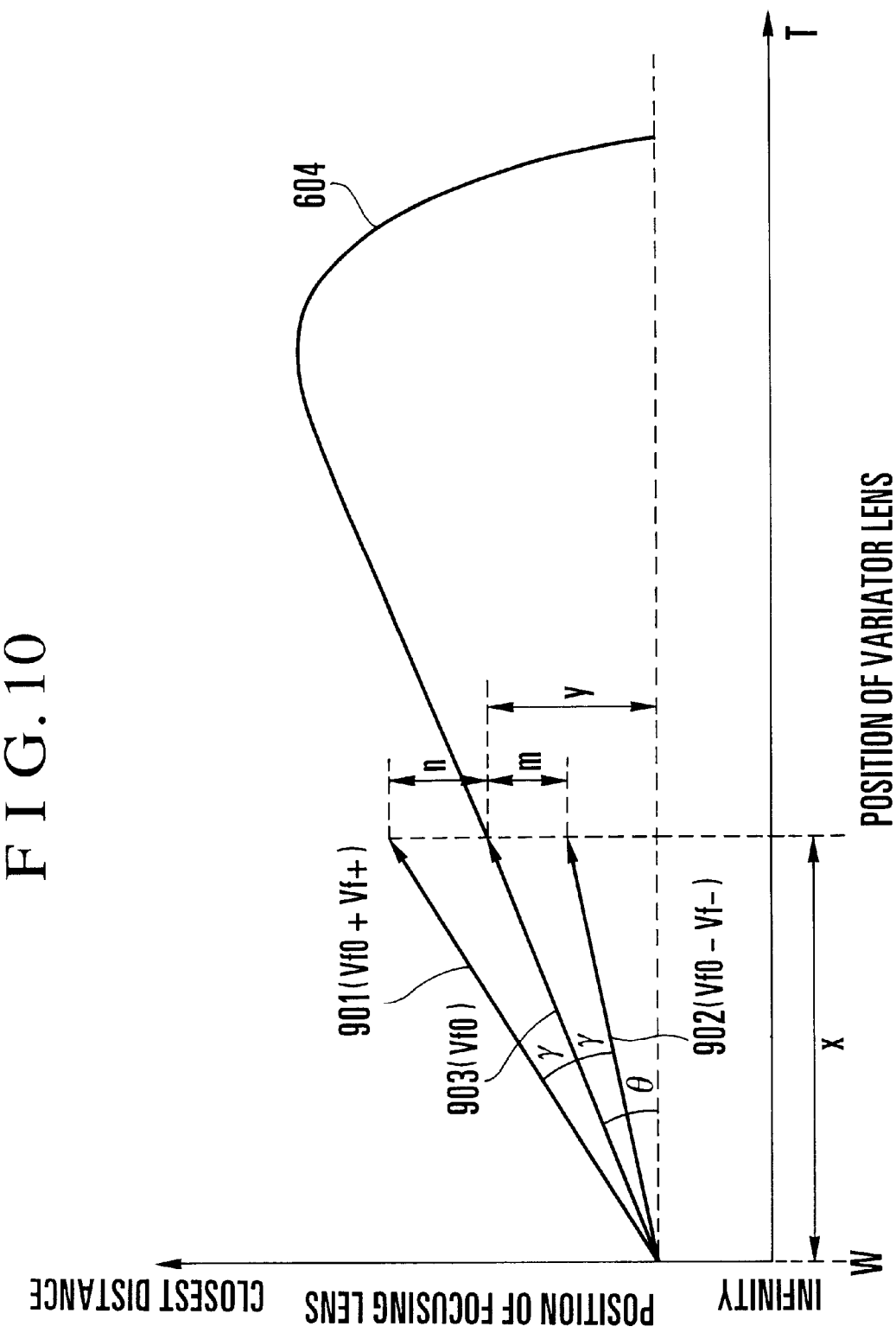
FIG. 10 is a view showing a method of calculating correction speeds Vf+ and Vf−.

FIG. 10 is a view aiding in explaining a method of calculating Vf+ and Vf−. FIG. 10 shows the position of the variator lens 102 along the horizontal axis and the position of the focusing lens 105 along the vertical axis, and the locus 604 shown in FIG. 5(b) is assumed to be a cam locus to be traced. A focusing speed at which the position of the focusing lens 105 varies by a distance "y" as the position of the variator lens 102 varies by a distance "x" is the standard speed Vf0 (903 in FIG. 10), a focusing speed at which the position of the focusing lens 105 varies by a distance "n" as the position of the variator lens 102 varies by the distance "x" is the correction speed Vf+ to be calculated, and a focusing speed at which the position of the focusing lens 105 varies by a distance "m" as the position of the variator lens 102 varies by the distance "x" is the correction speed Vf− to be calculated. The distances "n" and "m" are determined so that a focusing speed 901 of FIG. 10, which is obtained by adding the correction speed Vf+ to the standard speed Vf0 which creates a "+" state, and a focusing speed 902 of FIG. 10, which is a focusing speed (Vf0−Vf−) which creates a "−" state, have direction vectors which are spaced an equal angle $\gamma$ apart from the direction vector of the standard speed Vf0.

First, "m" and "n" are obtained. From FIG. 10, the following equations are geometrically obtained:

$$\tan\theta = y/x, \tan(\theta-\gamma)=(y-m)/x, \tan(\theta+\gamma)=(y+n)/x, \quad (2)$$

and $$\tan(\theta\pm\gamma)=(\tan\theta\pm\tan\gamma)/(1\mp\tan\theta\tan\gamma). \quad (3)$$

From the above equations (2) and (3), "m" and "n" are determined:

$$m=(x^2+y^2)/(x/k+y), \quad (4)$$

$$n=(x^2+y^2)/(x/k-y), \quad (5)$$

where $\tan\gamma=k$.

From the in-focus degree flag calculated in Step S304 of FIG. 8, the magnitude of $\gamma$ corresponds to an in-focus state when the value of "(peak evaluation value)÷(maximum value of luminance signal−minimum value of luminance signal)" is "1", and if such value is 0.8, the magnitude of $\gamma$ corresponding to the in-focus state is multiplied by 1.25, while if it is 0.5, the magnitude of $\gamma$ corresponding to the in-focus state is multiplied by 2. In this manner, a cam locus can be traced without deviating from an in-focus locus in the vicinity of an in-focus position, and if an out-of-focus state occurs due to a variation in a subject or the like, a new in-focus cam locus can be found by immediately displacing the focusing lens to a great extent (by increasing a correction speed).

The value of k is stored in a memory of the AF microcomputer 116 in the form of a table according to the value of $\gamma$. The stored value of k is read from the memory, as required, to calculate the above equations (4) and (5).

Assuming here that the position of the variator lens 102 varies by the distance "x" per unit time, the following relations are obtained:

a zooming speed vz=x, the focusing standard speed Vf0=y, the correction speed Vf+=n, the correction speed Vf−=m, and the correction speeds Vf+ and Vf− are obtained from the above equations (4) and (5).

Then, in Step S306, it is determined whether zooming from the wide-angle end toward the telephoto end is being performed. If zooming from the wide-angle end toward the telephoto end is not being performed, the process proceeds to Step S313, in which the respective correction speeds Vf+ and Vf− are set to Vf+=0 and Vf−=0. Then, the process proceeds to Step S309. If it is determined in Step S306 that zooming from the wide-angle end toward the telephoto end is being performed, the process proceeds to Step S307, in which it is determined whether the current level of a sharpness integral signal is less than TH1. If the current level of the sharpness integral signal is not less than TH1, the process proceeds to Step S309. If it is determined in Step S307 that the current level of the sharpness integral signal is less than TH1, the inversion flag is set to "1" in Step S308, and the process proceeds to Step S309. In Step S309, it is determined whether the value of the inversion flag is "1". If the value of the inversion flag is "1", the process proceeds to Step S310, in which it is determined whether the value of a correction flag is "1".

The correction flag is a flag which indicates whether the state of cam locus tracing is the "+" state or the "−" state. If it is determined in Step S310 that the value of the correction flag is not "1", the process proceeds to Step S315, in which the correction flag is set to "1" (the "+" state) and a focusing speed Vf is obtained:

$$Vf = Vf0 + Vf+ \quad (Vf0 \geq 0),$$

$$= Vf0 - Vf+ \quad (Vf0 < 0),$$

where Vf+$\geq$0. Then, the process proceeds to Step S312.

If it is determined in Step S310 that the value of the correction flag is "1", the process proceeds to Step S311, in which the correction flag is reset to "0" (the "−" state) and the focusing speed Vf is obtained:

$$Vf = Vf0 - Vf- \quad (Vf0 \geq 0),$$

$$= Vf0 + Vf- \quad (Vf0 < 0),$$

where Vf−$\geq$0. Then, the process proceeds to Step S312.

If it is determined in Step S309 that the value of the inversion flag is not "1", the process proceeds to Step S314, in which it is determined whether the value of the correction flag is "1". If the value of the correction flag is "1", the process proceeds to Step S315, whereas if the value of the correction flag is not "1", the process proceeds to Step S311. In Step S312, the focusing speed (focus locus tracing speed) Vf is set.

In this manner, the zooming processing operation of Step S205 of FIG. 7 is completed. After that, the AF microcomputer 116 actually executes the driving of the motors in Steps S206 and S207 of FIG. 7.

As described above, if it is necessary to perform a magnification varying operation while increasing or decreasing an evaluation value when an in-focus point is unknown, a sharpness integral signal is used to increase or decrease the evaluation signal, and the amount of displacement of the focusing lens for increasing or decreasing the evaluation value is controlled on the basis of the ratio of a peak value of a luminance signal to the difference between the maximum value and the minimum value of the luminance signal. Accordingly, it is possible to eliminate a variation in the evaluation value due to a variation in the angle of view of the sharpness integral signal, thereby improving the capability to trace a focus locus during the magnification varying operation.

Second Embodiment

A second embodiment of the present invention will be described below with reference to FIG. 11. The magnitude of $\gamma$ is varied according to the focal length, i.e., the value of $\gamma$ obtainable on the wide-angle side is multiplied by 0.8 with respect to the middle area and by 2 with respect to the telephoto area. In this manner, the increasing/decreasing period of a sharpness signal level which varies according to the state of driving of the focusing lens 105 can be kept constant with respect to a predetermined amount of positional variation of the focusing lens 105, so that it is possible to lower a possibility that a locus to be traced may be lost during zooming.

In the above description of the first embodiment, reference has been made to a method of eliminating a variation in an integral value due to a variation in an angle of view which occurs when a sharpness integral signal is used as an evaluation signal required to trace a focus locus during a magnification varying operation from a wide-angle side toward a telephoto side.

However, if high-speed zooming is selected when an image of a subject is out of focus due to a variation in the subject, it will be impossible to find an in-focus point without displacing the focusing lens at a high speed to a great extent. If low-speed zooming is selected, it will be possible to find an in-focus point while displacing the focusing lens little by little.

The second embodiment is, therefore, intended to vary the amount of displacement of the focusing lens (Vf+ and Vf−) according to the in-focus degree and the zooming speed.

Figure 11:
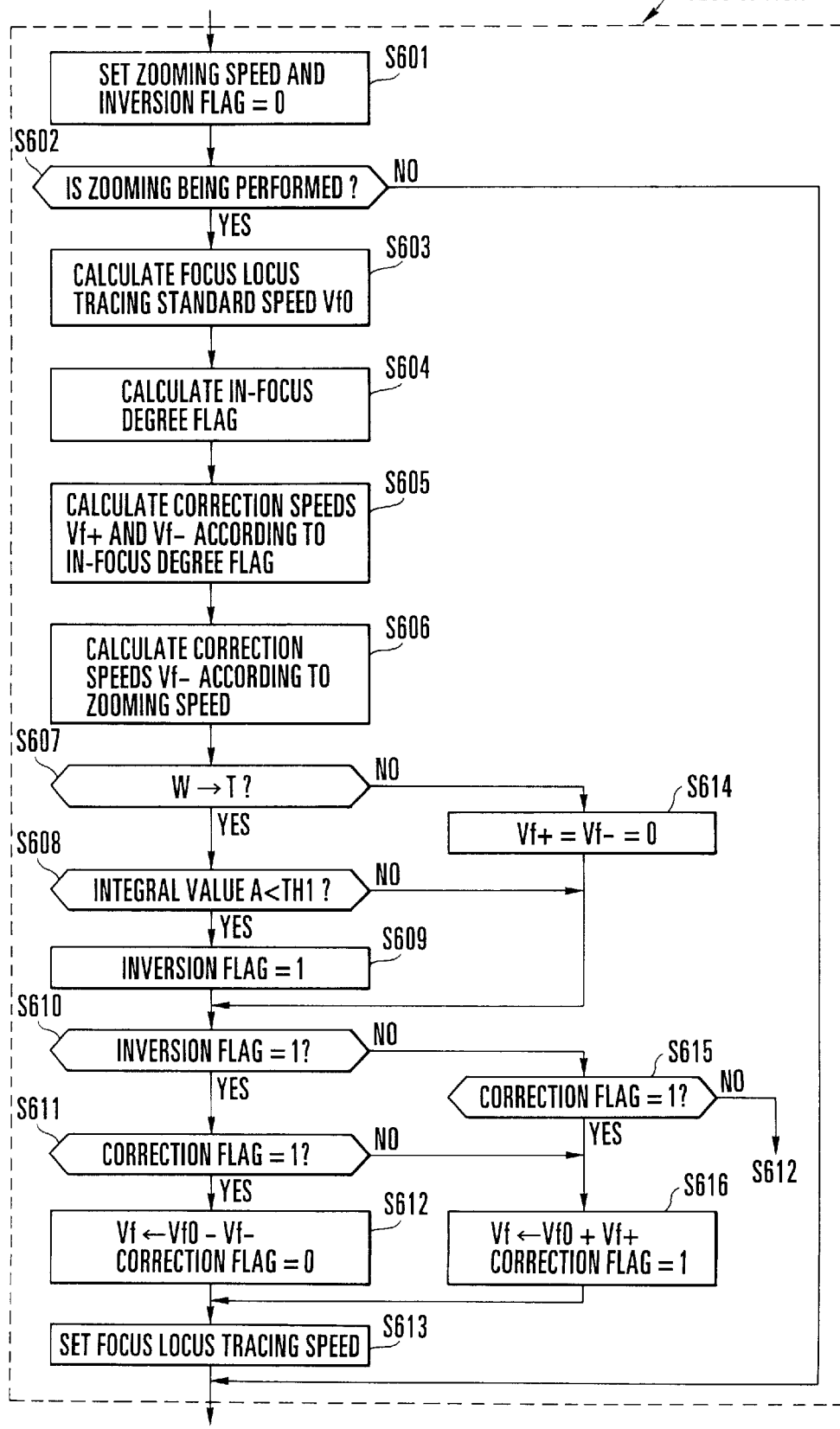
FIG. 11 is a flowchart showing an algorithm of the control operation of a lens control apparatus according to a second embodiment of the present invention.

FIG. 11 is a flowchart showing an algorithm of the control operation of the lens control apparatus according to the second embodiment, which algorithm is a subroutine incorporated in Step S205 of FIG. 7.

The difference between the second embodiment and the first embodiment resides in Step S606. In Step S604, the in-focus degree flag is calculated from the ratio of a sharpness peak signal to the difference between the maximum value and the minimum value of a luminance signal, and in Step S605, correction speeds are calculated according to the in-focus degree flag. Then, in Step S606, correction speeds are calculated according to the zooming speed. For example, if a lowest zooming speed is set as a reference speed, the value of Vf± obtained in Step S605 is multiplied by 1.5 in the case of a middle zooming speed, whereas the value of Vf± obtained in Step S605 is multiplied by 2 in the case of a highest zooming speed.

The following steps S607 to S616 are identical to Steps S306 to S315 of FIG. 8.

As described above, since the correction speeds calculated according to the in-focus degree flag are controlled on the basis of the zooming speed, even if the state of a subject changes during a magnification varying operation, appropriate correction speeds can be calculated, so that it is possible to improve the capability to select an in-focus locus and the capability to trace a focus locus.

Third Embodiment

A third embodiment of the present invention will be described below with reference to FIGS. 12 and 13. In the above description of the first and second embodiments, reference has been made to a method which uses a sharpness integral signal as an evaluation signal required for tracing a focus locus during a magnification varying operation from a wide-angle side to a telephoto side and which uses the ratio of a sharpness peak value to the difference between the maximum value and the minimum value of a luminance signal in order to determine correction speeds required for tracing a variation in a focus locus due to a variation in a subject.

However, either of the methods according to the first and second embodiments is effective only when a variation in a sharpness signal is due to a variation in a subject and a movement of a lens, but, for example, if the level of an in-focus degree flag becomes low due to external noise such as a camera shake, an increase in a correction speed may cause a deviation from an in-focus locus because the in-focus locus is being traced.

The third embodiment is, therefore, intended to vary the correction speeds on the basis of external information relative to a camera shake or the like.

Figure 12:
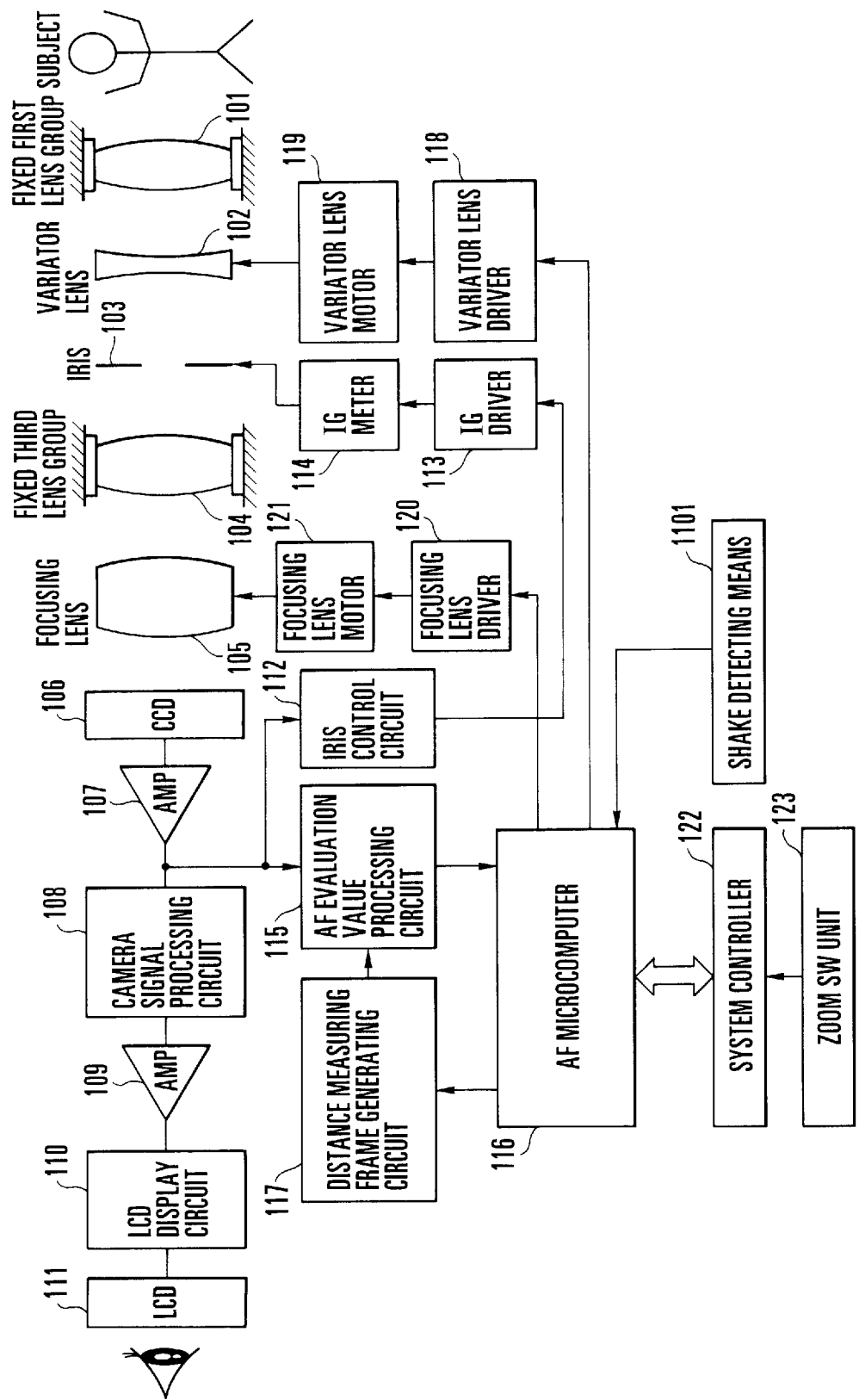
FIG. 12 is a block diagram showing the arrangement of a video camera system having a lens control apparatus according to a third embodiment of the present invention.
Figure 13:
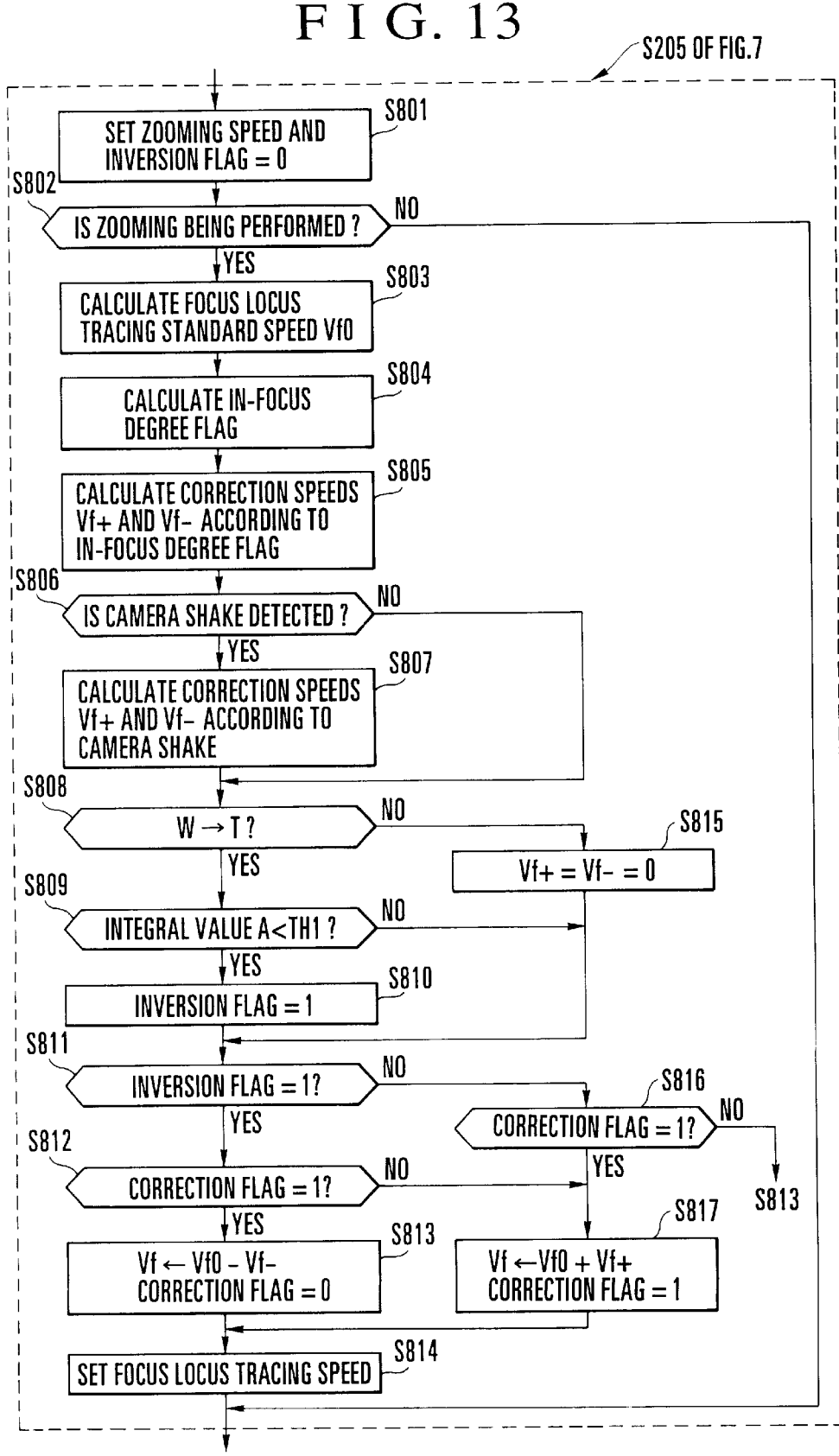
FIG. 13 is a flowchart showing an algorithm of the control operation of the lens control apparatus shown in FIG. 12.

FIG. 12 is a block diagram showing the arrangement of a video camera system which is provided with a lens control apparatus according to the third embodiment of the present invention. FIG. 13 is a control flowchart for carrying out the present invention, showing a subroutine incorporated in Step S205 of FIG. 7.

The difference between the third embodiment and the first embodiment resides in Steps S806 and S807. In Step S806, camera shake information is obtained through shake detecting means 1101 (shown in FIG. 12) which uses an angular speed sensor or an acceleration sensor. If a camera shake is detected in Step S806, the process proceeds to Step S807, in which, for example, if a large camera shake has occurred, the correction speed Vf± calculated in Step S805 is multiplied by 0.5, whereas if a small camera shake has occurred, the correction speed Vf± calculated in Step S805 is multiplied by 0.8.

The following steps S808 to S817 are identical to Steps S306 to S315 of FIG. 8.

As described above, by varying correction speeds on the basis of camera shake information, it is possible to select an appropriate in-focus locus during a magnification varying operation and to improve the capability to trace a focus locus.

Fourth Embodiment

A storage medium which stores a program for controlling the lens control apparatus according to the present invention will be described below with reference to FIG. 14.

Figure 14:
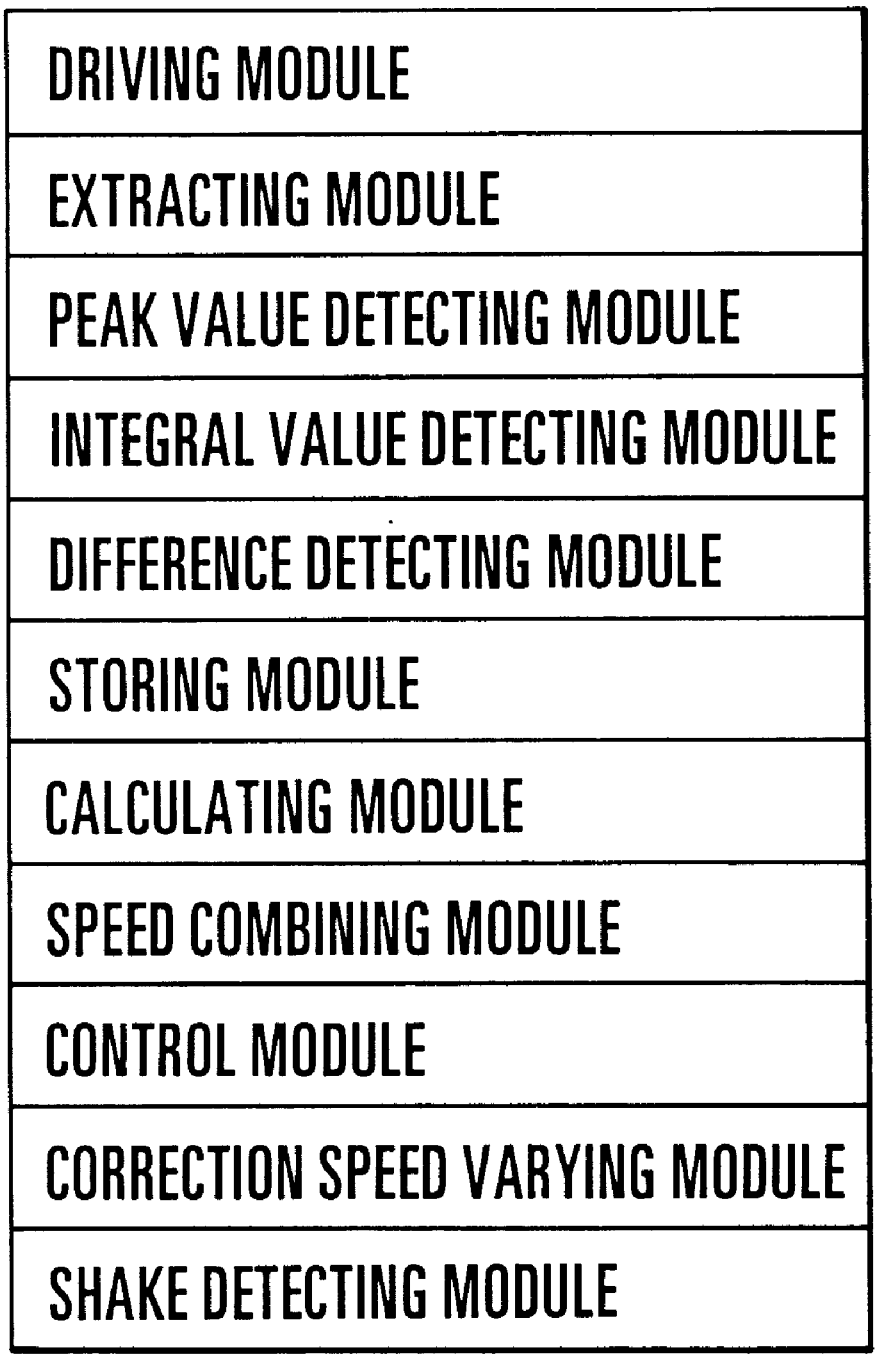
FIG. 14 is a view showing the program modules stored in a storage medium according to the present invention.

As shown in FIG. 14, program codes for a plurality of modules may be stored in the storage medium which stores a program for controlling the lens control apparatus according to the present invention, and such modules include a driving module, an extracting module, a peak value detecting module, an integral value detecting module, a difference detecting module, a storing module, a calculating module, a speed combining module, a control module, a correction speed varying module and a shake detecting module.

The driving module is a program module for moving the variator lens and the focusing lens independently of each other in parallel with an optical axis. The extracting module is a program module for extracting a high-frequency component from a luminance signal of a picked-up subject image. The peak value detecting module is a program module for detecting a peak value of the high-frequency component. The integral value detecting module is a program module for detecting an integral value of the high-frequency component. The difference detecting module is a program module for detecting the difference between the maximum value and the minimum value of the luminance signal. The storing module is a program module for storing an in-focus position of the focusing lens relative to the position of the variator lens in storage means according to a subject distance. The calculating module is a program module for obtaining a standard moving speed of the focusing lens which corrects the focal plane during the movement of the variator lens, from the information stored in the storage means. The speed combining module is a program module for combining a correction speed with the standard moving speed of the focusing lens obtained by the calculating module, during a magnification varying operation. The control module is a program module for, during the magnification varying operation, controlling the direction of the correction speed according to a variation in the integral value of the high-frequency component, controlling the correction speed on the basis of the ratio of the peak value of the high-frequency component to the difference between the maximum value and the minimum value of the luminance signal, and executing control to combine the correction speed with the standard moving speed of the focusing lens during the magnification varying operation. The correction speed varying module is a program module for varying the correction speed which is controlled on the basis of the ratio of the peak value of the high-frequency component to the difference between the maximum value and the minimum value of the luminance signal according to the magnification varying speed. The shake detecting module is a program module for detecting a camera shake.

As described above in detail, according to the above-described embodiments, during the zooming operation of causing a focus adjusting lens to trace an in-focus locus while increasing or decreasing a sharpness integral signal, the magnitude of a correction speed is determined on the basis of the ratio of a sharpness peak value to the difference between the maximum value and the minimum value of a luminance signal. Accordingly, it is possible to improve the capability to select an in-focus locus for zooming and the capability to trace a variation in a focus locus.

Furthermore, during the zooming operation of causing the focus adjusting lens to trace an in-focus locus while increasing or decreasing the sharpness integral signal, the magnitude of the correction speed which has been determined on the basis of the ratio of the sharpness peak value to the difference between the maximum value and the minimum value of the luminance signal is varied according to the zooming speed. Accordingly, it is possible to improve the capability to select an in-focus locus and the capability to trace a variation in a focus locus irrespective of the zooming speed, with respect to a variation in a subject during zooming.

Furthermore, during the zooming operation of causing the focus adjusting lens to trace an in-focus locus while increasing or decreasing the sharpness integral signal, the magnitude of the correction speed which has been determined on the basis of the ratio of the sharpness peak value to the difference between the maximum value and the minimum value of the luminance signal is varied according to external information relative to a camera shake or the like. Accordingly, it is possible to improve the capability to select an in-focus locus and the capability to trace a variation in a focus locus, with respect to external noise during zooming.

I claim:

1. A lens control method comprising:
    a driving step of moving a first lens group for performing a magnification varying operation and a second lens group for correcting a movement of a focal plane during a movement of the first lens group;
    an extracting step of extracting a high-frequency component from a luminance signal of a picked-up subject image;
    a peak value detecting step of detecting a peak value of the high-frequency component;
    an integral value detecting step of detecting an integral value of the high-frequency component;
    a difference detecting step of detecting a difference between a maximum value and a minimum value of the luminance signal;
    a calculating step of obtaining a standard moving speed of the second lens group for correcting the movement of the focal plane during the movement of the first lens group, from information in which is stored an in-focus position of the second lens group relative to a position of the first lens group according to a subject distance;
    a speed combining step of performing a correction speed of the standard moving speed of the second lens group obtained in said calculating step during the magnification varying operation; and
    a control step of, during the magnification varying operation, controlling a direction of the correction speed according to a variation in the integral value, controlling the correction speed on the basis of a ratio of the peak value to the difference, and executing control to combine the correction speed with the standard moving speed during the magnification varying operation.

2. A lens control method according to claim 1, further comprising a correction speed varying step of varying according to a zooming speed the correction speed to be controlled on the basis of the ratio of the peak value to the difference.

3. A lens control method according to claim 1, further comprising a shake detecting step of detecting a shake and a correction speed varying step of varying the correction speed on the basis of information detected in said shake detecting step.

4. A lens control apparatus comprising:
    a first lens group for performing a magnification varying operation;
    a second lens group for correcting a movement of a focal plane during a movement of the first lens group;
    driving means for moving said first lens group and said second lens group;
    extracting means for extracting a high-frequency component from a luminance signal of a picked-up subject image;
    peak value detecting means for detecting a peak value of the high-frequency component;
    integral value detecting means for detecting an integral value of the high-frequency component;
    difference detecting means for detecting a difference between a maximum value and a minimum value of the luminance signal;
    storing means in which is stored an in-focus position of said second lens group relative to a position of said first lens group according to a subject distance;
    calculating means for obtaining from information stored in said storing means a standard moving speed of said second lens group for correcting the movement of the focal plane during the movement of said first lens group;
    speed combining means for combining a correction speed with the standard moving speed of said second lens group obtained by said calculating means during the magnification varying operation; and
    control means for, during the magnification varying operation, controlling a direction of the correction speed according to a variation in the integral value, controlling the correction speed on the basis of a ratio of the peak value to the difference, and executing control to combine the correction speed with the standard moving speed during the magnification varying operation.

5. A lens control apparatus according to claim 4, further comprising correction speed varying means for varying according to a zooming speed the correction speed to be controlled on the basis of the ratio of the peak value to the difference.

6. A lens control apparatus according to claim 4, further comprising shake detecting means for detecting a shake and correction speed varying means for varying the correction speed on the basis of information detected by said shake detecting means.

7. A lens control apparatus according to claim 4, wherein said driving means includes a motor and a driver.

8. A lens control apparatus according to claim 4, wherein said extracting means includes an AF evaluation value circuit.

9. A lens control apparatus according to claim 4, wherein said peak value detecting means is included in a microcomputer.

10. A lens control apparatus according to claim 4, wherein said integral value detecting means is included in a microcomputer.

11. A lens control apparatus according to claim 4, wherein said difference detecting means is included in a microcomputer.

12. A lens control apparatus according to claim 4, wherein said storing means is a RAM.

13. A lens control apparatus according to claim 4, wherein said calculating means is included in a microcomputer.

14. A lens control apparatus according to claim 4, wherein said speed combining means is included in a microcomputer.

15. A lens control apparatus according to claim 4, wherein said control means is included in a microcomputer.

16. A storage medium in which a program for controlling a lens control apparatus is stored, said program comprising:
   a driving module for executing a driving step of moving a first lens group for performing a magnification varying operation and a second lens group for correcting a movement of a focal plane during a movement of the first lens group;
   an extracting module for executing an extracting step of extracting a high-frequency component from a luminance signal of a picked-up subject image;
   a peak value detecting module for executing a peak value detecting step of detecting a peak value of the high-frequency component;
   an integral value detecting module for executing an integral value detecting step of detecting an integral value of the high-frequency component;
   a difference detecting module for executing a difference detecting step of detecting a difference between a maximum value and a minimum value of the luminance signal;
   a storing module in which is stored an in-focus position of the second lens group relative to a position of the first lens group according to a subject distance;
   a calculating module for executing a calculating step of obtaining from information stored in said storing module a standard moving speed of the second lens group for correcting the movement of the focal plane during the movement of the first lens group;
   a speed combining module for executing a speed combining step of combining a correction speed with the standard moving speed of the second lens group obtained in said calculating step during the magnification varying operation; and
   a control module for executing a control step of, during the magnification varying operation, controlling a direction of the correction speed according to a variation in the integral value, controlling the correction speed on the basis of a ratio of the peak value to the difference, and executing control to combine the correction speed with the standard moving speed during the magnification varying operation.

17. A storage medium according to claim 16, wherein said program further comprises a correction speed varying module for executing a correction speed varying step of varying according to a zooming speed the correction speed to be controlled on the basis of the ratio of the peak value to the difference.

18. A storage medium according to claim 16, wherein said program further comprises a shake detecting module for executing a shake detecting step of detecting a shake and a correction speed varying module for executing a correction speed varying step of varying the correction speed on the basis of information detected in said shake detecting step.

19. A lens control method comprising:
   a driving step of moving a first lens group for performing a magnification varying operation and a second lens group for compensating a movement of a focal position during a movement of the first lens group;
   an extracting step of extracting a focus signal component from a luminance signal of an image signal;
   a peak value detecting step of detecting a peak value of the focus signal component;
   an integral value detecting step of detecting an integral value of the focus signal component;
   a difference detecting step of detecting a difference between a maximum value and a minimum value of the luminance signal;
   a calculating step of obtaining a standard moving speed of the second lens group for compensating the movement of the focal position during the movement of the first lens group, from information in which is stored an in-focus position of the second lens group relative to a position of the first lens group according to a subject distance;
   a speed correcting step of performing a correction of the standard moving speed of the second lens group obtained in said calculating step during the magnification varying operation; and
   a control step of, during the magnification varying operation, controlling a direction of the correction according to a variation in the integral value, controlling a speed of the correction on the basis of a ratio of the peak value to the difference.

20. A lens control method according to claim 19, further comprising a correction speed varying step of varying, according to a zooming speed, the speed of the correction to be controlled on the basis of the ratio of the peak value to the difference.

21. A lens control method according to claim 19, further comprising a shake detecting step of detecting a shake and a correction speed varying step of varying the speed of the correction on the basis of information detected in said shake detection step.

22. A lens control apparatus comprising:
   a first lens group for performing a magnification varying operation;
   a second lens group for correcting a movement of a focal plane during a movement of the first lens group;
   driving means for moving said first lens group and said second lens group;
   extracting means for extracting a focus signal component from an image signal;
   peak value detecting means for detecting a peak value of the focus signal component;
   integral value detecting means for detecting an integral value of the focus signal component;
   difference detecting means for detecting a difference between a maximum value and a minimum value of the image signal;
   storing means in which is stored an in-focus position of said second lens group relative to a position of said first lens group according to a subject distance;
   calculating means for selecting from information stored in said storing means a standard moving speed of said second lens group for correcting the movement of the focal position during the movement of said first lens group;

speed correcting means for correcting the standard moving speed of said second lens group selected by said calculating means during the magnification varying operation; and control means for, during the magnification varying operation, controlling a direction of a correction speed of said speed correcting means according to a variation in the integral value, controlling a correction speed of said speed correcting means on the basis of a ratio of the peak value to the difference.

23. A lens control apparatus according to claim 22, further comprising correction speed varying means for varying according to a zooming speed the correction speed to be controlled on the basis of the ratio of the peak value to the difference.

24. A lens control apparatus according to claim 22, further comprising shake detecting means for detecting a shake and correction speed varying means for varying the correction speed on the basis of information detected by said shake detecting means.

25. A lens control apparatus according to claim 24, wherein said driving means includes a motor and a driver, and said extracting means includes an AF evaluation circuit.

26. A lens control apparatus comprising:

a first lens group for performing a magnification varying operation;

a second lens group for correcting a movement of a focal plane during a movement of the first lens group;

driving means for moving said first lens group and said second lens group;

extracting means for extracting a focus signal component from an image signal;

integral value detecting means for detecting an integral value of the focus signal component;

difference detecting means for detecting a difference between a maximum value and a minimum value of the image signal;

storing means in which is stored an in-focus position of said second lens group relative to a position of said first lens group according to a subject distance;

calculating means for selecting from information stored in said storing means a standard moving speed of said second lens group for correcting the movement of the focal plane during the movement of said first lens group;

correcting means for correcting the standard moving speed of said second lens group selected by said calculating means during the magnification varying operation; and control means for controlling a direction of a correction by said correcting means according to a variation in the integral value.

27. A lens control apparatus according to claim 26, further comprising correction speed varying means for varying according to a zooming speed a correction speed of said correcting means.

28. A lens control apparatus according to claim 26, further comprising shake detecting means for detecting a shake and correction speed varying means for varying the correction speed of said correcting means on the basis of information detected by said shake detecting means.

29. A lens control apparatus according to claim 26, wherein said integral value detecting means is included in a microcomputer.

30. A lens control apparatus comprising:

a first lens group for performing a magnification varying operation;

a second lens group for correcting a movement of a focal plane during a movement of the first lens group;

driving means for moving said first lens group and said second lens group;

extracting means for extracting a focus signal component from an image signal;

peak value detecting means for detecting a peak value of the focus signal;

difference detecting means for detecting a difference between a maximum value and a minimum value of the image signal;

storing means in which is stored an in-focus position of said second lens group relative to a position of said first lens group according to a subject distance;

calculating means for selecting from information stored in said storing means a standard moving speed of said second lens group for correcting the movement of the focal plane during the movement of said first lens group;

speed correcting means for correcting the standard moving speed of said second lens group obtained by said calculating means during the magnification varying operation; and control means for controlling a correction speed of said speed correcting means on the basis of a ratio of the peak value to the difference.

31. A lens control apparatus according to claim 30, further comprising correction speed varying means for varying according to a zooming speed the correction speed to be controlled on the basis of the ratio of the peak value of the difference.

32. A lens control apparatus according to claim 30, further comprising shake detecting means for detecting a shake and correction speed varying means for varying the correction speed on the basis of information detected by said shake detecting means.

* * * * *